(12) United States Patent
Wallstedt (10) Patent No.: US 6,418,313 B1
(45) Date of Patent: Jul. 9, 2002

(54) SYSTEMS AND METHODS FOR TRACKING OF A PRIVATE COMMUNICATION SYSTEM SUBJECT TO RETUNING

(75) Inventor: Kenneth Wallstedt, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/163,810

(22) Filed: Sep. 30, 1998

(51) Int. Cl.$^7$ ................................................ H04Q 7/20
(52) U.S. Cl. ........................ 455/434; 455/515; 455/452
(58) Field of Search ................................ 455/434, 418, 455/452, 462, 458, 161.1, 166.2, 511, 450, 500, 509, 515, 516, 77; 370/337

(56) References Cited

U.S. PATENT DOCUMENTS

| | | | | |
|---|---|---|---|---|
| 5,353,332 A | * | 10/1994 | Raith et al. | 455/455 |
| 5,640,677 A | * | 6/1997 | Karlsson | 455/434 |
| 5,732,353 A | * | 3/1998 | Haartsen | 455/450 |
| 5,732,360 A | * | 3/1998 | Jarett et al. | 455/552 |
| 5,794,157 A | * | 8/1998 | Haartsen | 455/522 |
| 5,828,963 A | * | 10/1998 | Grandhi | 455/450 |
| 5,898,928 A | * | 4/1999 | Karlsson et al. | 455/450 |
| 5,903,838 A | * | 5/1999 | Yazaki et al. | 455/434 |
| 5,903,839 A | * | 5/1999 | Mattila | 455/434 |
| 5,995,834 A | * | 11/1999 | Moore | 455/434 |
| 6,144,653 A | * | 11/2000 | Persson et al. | 370/337 |

FOREIGN PATENT DOCUMENTS

WO    WO 97/09835    3/1997

OTHER PUBLICATIONS

Excerpt from IS–136 Rev. A Specification, Apr. 1997.
Copy of International Search Report for PCT/US 99/18180 (mailed Nov. 24, 1999).

\* cited by examiner

Primary Examiner—Dwayne Bost
Assistant Examiner—Sonny Trinh
(74) Attorney, Agent, or Firm—Myers Bigel Sibley & Sajovec (57) ABSTRACT

Methods and systems are provided for tracking of a private communication system allowing operation of a mobile terminal with both a public communication system and the private communication system even when the private communication system retunes its control channel while not in communication with the mobile terminal. This automatic selection of the new control channel for the private communication system is provided by communication of both the current control channel frequency and one or more candidate control channel frequencies which will be used in turn by the private radio communication system in retunes. These candidate frequencies are originally provided to the mobile terminal, for example, when it first establishes a connection with the private communication system. The candidate control channel frequency information is updated during periods when the mobile terminal is connected to the private communication system. When the mobile terminal subsequently leaves the coverage area of the private communication system and then returns to find that the control channel previously used is no longer in use, it attempts to establish a connection using the candidate control channel frequencies. Accordingly, the mobile terminal is able to respond to retunes occurring while it is not in communication with the private communication system without the need for user intervention.

27 Claims, 5 Drawing Sheets

SYSTEMS AND METHODS FOR TRACKING OF A PRIVATE COMMUNICATION SYSTEM SUBJECT TO RETUNING

FIELD OF THE INVENTION

This invention relates to communication systems and more particularly to acquisition of communication systems by mobile terminals.

BACKGROUND OF THE INVENTION

Public wireless radiotelephone systems are commonly employed to provide voice and data communications to subscribers. For example, analog cellular radiotelephone systems, such as designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

Figure 1:
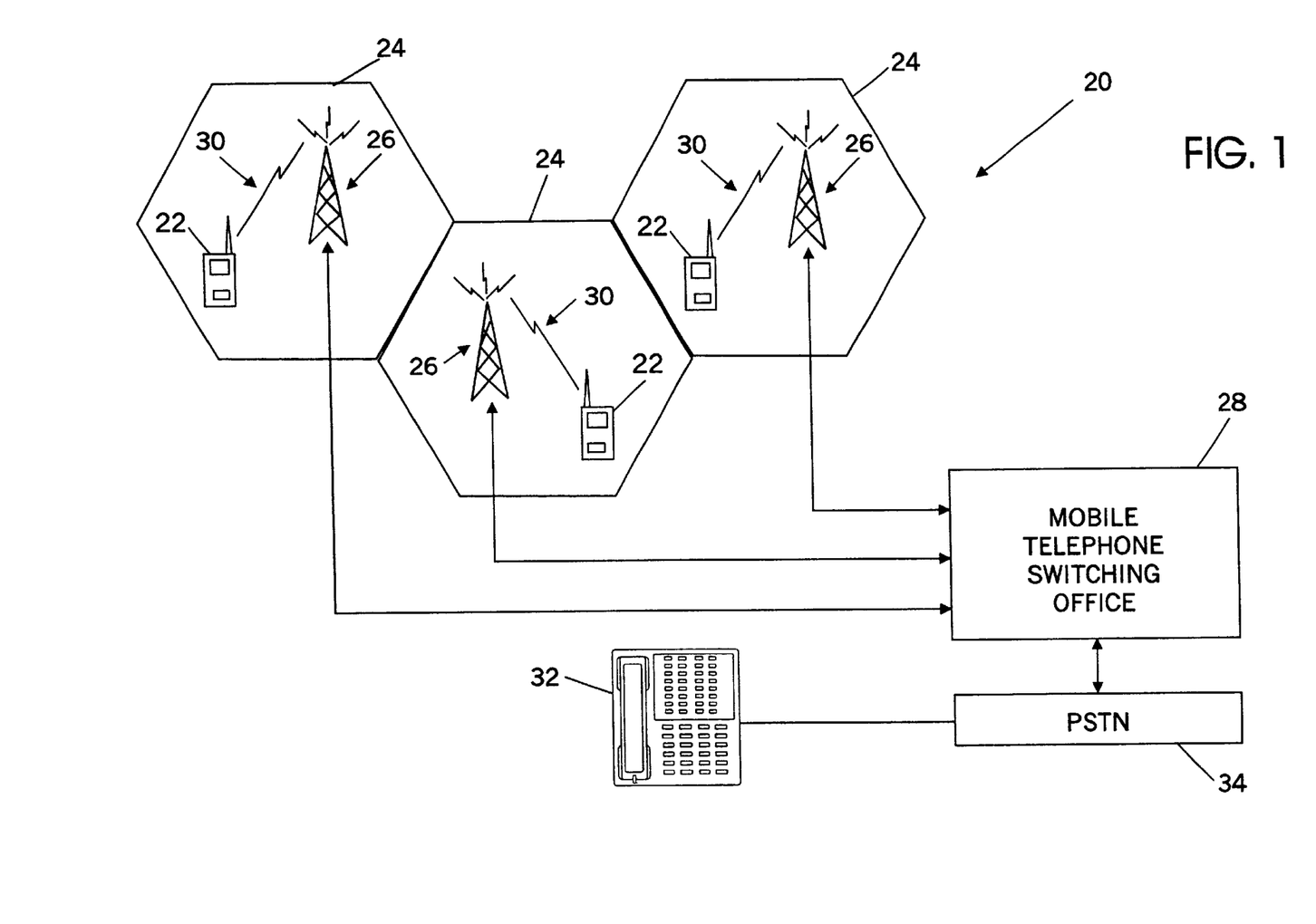
FIG. 1 schematically illustrates a portion of a public wide area cellular network including a plurality of base stations servicing different geographic areas.

FIG. 1 illustrates a conventional terrestrial wireless public communication system 20 that may implement one of the aforementioned wireless communication standards. The wireless system may include one or more wireless mobile terminals 22 that communicate within a plurality of cells 24 served by base stations 26 and a mobile telephone switching office (MTSO) 28. Although only three cells 24 are shown in FIG. 1, a typical cellular radiotelephone network may comprise hundreds of cells, and may include more than one MTSO 28 and may serve thousands of wireless mobile terminals 22.

The cells 24 generally serve as nodes in the communication system 20, from which links are established between wireless mobile terminals 22 and a MTSO 28, by way of the base stations 26 servicing the cells 24. Each cell 24 will have allocated to it one or more dedicated control channels and one or more traffic channels. Through the communication system 20, a duplex radio communication link 30 may be effected between two wireless mobile terminals 22 or between a wireless mobile terminal 22 and a landline telephone user 32 via a public switched telephone network (PSTN) 34. The function of the base station 26 is commonly to handle the radio communications within the cell 24 to and from the wireless mobile terminal 22. In this capacity, the base station 26 functions chiefly as a relay station for data and voice signals.

As mobile terminals in cellular radio communication systems may cross geographic regions served by different base stations, it is known in the prior art that means should be provided to select the appropriate base station to service a mobile terminal. In the U.S. AMPS system, the mobile terminal would typically use signal strength measurements (such as RSSI) to determine the strongest base station to which it should listen for calls during standby (idle) mode. This determination of which base station to communicate with may be referred to as site scanning (reselection) as periodically the radiotelephone determines the RSSI for other base station sites. Also in the U.S. AMPS system, base stations belonging to the cellular network typically listen to the signal strengths received from mobile telephones that are actively transmitting during calls, and the network uses its measurements to determine an optimum base station for handling a call in progress. When a call in progress is switched from one base station to another, it is commonly known as "handover" or "handoff."

Cellular telephones using a Time Division Multiple Access (TDMA) method conforming to the TDMA cellular standards, for example, those known respectively as GSM, D-AMPS, IS54, IS136 or PCS1900, may use spare time between transmit and receive timeslots to change frequency and monitor the signal strengths of other base stations. The mobile telephone may make measurements of the signal strengths received from surrounding base stations. Mobile Assisted Handover (MAHO) may be implemented using these measurements. The measurements are typically reported to the currently serving base station, which determines if a handoff or reselection should be made to another base station.

The control channel as described above is a dedicated channel used for transmitting cell identification and paging information often referred to as a broadcast control channel (BCCH). Identification information in, for example, an IS-136 system may be referred to as a Public Service Profile (PSP) and may include frequency information on various channels as well as the cell's associated Digital Voice Color Code (DVCC), System Identification (SID), System Operator Code (SOC) and Mobile Country Code (MCC). The traffic channels carry the voice and data information. The dedicated control channels are generally broadcast using a different radio frequency in each cell to allow frequency reuse for greater system capacity while limiting the problems caused by interference. The traffic channels are also typically allocated among a plurality of radio frequencies to reduce and preferably eliminate interference using conventional frequency allocation techniques that are well known to those having skill in the art. However, capacity problems may still be encountered, such as in high population density areas.

Capacity limitations and cost and service considerations have been addressed by using private wireless communication systems, which use low power cellular transmissions that provide coverage over a smaller area. These private communication systems may be located within the coverage area of a public communication system such as one of the cellular systems described above. An indoor cellular communication system typically includes one or more mobile stations or units, one or more base stations, a radio control interface, and a mobile switching center. A typical indoor cellular network may have one or more cells.

It is desirable for mobile terminals having access rights to both public and private communication systems to determine the availability of both systems when in operation. Accordingly, it is known, for example under the IS-136, Rev. A standard, to provide mobile terminals which monitor not only for alternate base stations within the public network but also to monitor for transmissions from private communication systems. It is also known to provide transmission of identification information from private communication systems for use by the mobile terminal in its monitoring operations.

Under the IS-136 standard, the private communication system transmits identification information referred to as Private Operating Frequencies (POF). The POFs retained by a mobile terminal are a set of private communication system control frequencies previously identified by the mobile terminal as being actively in use by a private communication system within the vicinity of a public cell (associated by the mobile terminal with a specific control channel frequency) for which the mobile terminal has retained a PSP. Upon acquisition of a particular control channel (CCH) transmission, the mobile terminal may recognize the control channel as corresponding to a PSP retained by the mobile terminal and declare a PSP match. When a PSP match is declared, any stored associated POFs are treated as reselection candidates for the mobile terminal. If the mobile terminal then finds a satisfactory POF candidate (for example, with acceptable signal strength), the mobile terminal typically registers for service on the private communication network (which has an associated private system identification or PSID) and switches to a non-public mode of operation.

A mobile terminal supporting PSP/POF pursuant to the IS-136 Rev. A. standard typically stores at least 4 PSPs and 4 POFs per private communication system (PSID) as shown in Table 1 below. Each private system has an associated identifier (PSID). The PSP/POF information for each PSID is typically updated by information transmitted by the private system on its control channel. Accordingly, the mobile terminal generally must be locked on to the private system's control channel to be updated if the POF information changes. Furthermore, under IS-136, one of the POFs is the currently used control channels for the private system.

TABLE 1

| PSID | |
|---|---|
| PSP#1 | POF#1 |
| PSP#2 | POF#2 |
| PSP#3 | POF#3 |
| PSP#4 | POF#4 |

One problem with this approach to integrating private and public systems is that private communication systems may operate within the same frequency spectrum as the surrounding public system and/or adjacent private communication systems. Accordingly, to overcome interference problems, private communication systems may be provided with adaptive channel allocation (ACA) or other automated frequency reallocation means. Therefore, private communication systems may retune on occasion, i.e., change the frequency used for the control channel (or channels in some cases) transmission by the private communication system.

After a retune, the PSP/POF typically must be updated in the mobile terminals. However, for mobile terminals that are not receiving transmissions at the time of the retune, the change will not be received and the mobile terminal will not have a correct POF for the PSP match (i.e. for the public region in which the private system is located). Therefore, the mobile terminal will not be expected to find and camp on the private system automatically. Under the IS-136 standard, this problem is addressed by requiring the user of the mobile terminal to force a non-public search by the mobile terminal to find the private communication system.

In light of the above discussion, improvements are needed in integration of private and public communication systems to provide improved user perception of the ease of accessing either type of system.

SUMMARY OF THE INVENTION

It is, therefore, an objective of the present invention to resolve the problem of integration of public communication systems with communication systems subject to retuning.

It is a further objective of the present invention to provide systems and methods which provide users with mobile terminals which automatically track retuning of communication systems without requiring user intervention.

These and other objects are provided, according to the invention, by providing methods and systems for tracking of a communication system allowing operation of a mobile terminal with both a public communication system and the private communication system even when the private communication system retunes its control channel whether or not the mobile terminal is in communication with the private system at that time. This automatic selection of the new control channel for the private communication system is provided by communication of both the current control channel frequency and one or more candidate control channel frequencies which will be used in turn by the private radio communication system in retunes. These candidate frequencies are originally provided to the mobile terminal, for example, when it first establishes a connection with the private communication system. The candidate control channel frequency information is updated during periods when the mobile terminal is connected to the private communication system. When the mobile terminal subsequently leaves the coverage area of the private communication system and then returns to find that the control channel previously used is no longer in use, it attempts to establish a connection using the candidate control channel frequencies. Accordingly, the mobile terminal is able to respond to retunes occurring while it is not in communication with the private communication system without the need for user intervention.

In particular, a method for tracking of a private communication system is provided. A first control channel frequency for the private communication system is selected as well as a candidate control channel frequency. Control information is transmitted on the first control channel frequency which includes an identification of the candidate control channel frequency and an identification of the private communication system. The private communication system may be a TDMA system such as an IS-136 compliant system. The private communication system is preferably within a cell of a public communication system and the control information then also includes identification information for the public cell. In one embodiment of the present invention, the identification information for the cell is a PSP for the cell.

In another embodiment of the methods of the present invention, after the control information is transmitted at the first control channel frequency, the private communication system is retuned to transmit control information on the candidate control channel frequency instead of the first control channel frequency. The control information is then transmitted on the candidate control channel frequency. The control information then includes an identification of a second selected candidate control channel frequency and an identification of the private communication system. Preferably, retuning is performed using an adaptive channel allocation scheme having a determined sequence of alternate candidate carriers for retuning.

In a further embodiment of the methods of the present invention, a plurality of candidate control channel frequencies are selected for the private communication system. Identifications of the plurality of candidate control channel frequencies are transmitted in the control information.

In another aspect of the methods of the present invention, the control information is received by a mobile terminal on the first control channel frequency from the private communication system. The mobile terminal subsequently receives control information from the private communication system on the candidate control channel frequency if control information from the private communication system is absent from the first control channel frequency. The private communication system is retuned to transmit control information on the candidate control channel frequency instead of the first control channel frequency. The control information transmitted on the candidate control channel frequency includes an identification of a second selected candidate control channel frequency and an identification of the private communication system. The mobile terminal then receives control information from the private communication system on the second selected candidate control channel frequency if control information from the private communication system is not being received on either the first control channel frequency or the candidate control channel frequency.

In a system aspect of the present invention, a private communication system is provided. The system includes a means for selecting a first control channel frequency for a control channel and at least one candidate control channel frequency. The system further includes a means coupled to the means for selecting for changing a frequency on which the private communication system transmits the control channel from the first control channel frequency to a selected one of the at least one candidate control channel frequency. The control information is transmitted by a means coupled to the means for changing a frequency on which the private communication system transmits for transmitting control information on the control channel. The control information includes an identification of the at least one candidate control channel frequency and an identification of the private communication system. The private communication system may be an IS-136 compliant system. The private communication system may be within a cell of a public communication system and the control information may then include identification information for the cell such as a public service profile for the cell.

In a further aspect of the present invention, a mobile terminal is provided for use with a private communication system which transmits control information on one of a plurality of control channel frequencies. The mobile terminal includes a means for receiving the control information including an identification of a candidate control channel frequency selected from the plurality of control channel frequencies on a first control channel frequency selected from the plurality of control channel frequencies. The mobile terminal further includes means for receiving control information from the private communication system on the candidate control channel frequency if control information from the private communication system is not being received on the first control channel frequency.

Accordingly, the present invention provides systems and methods allowing operation of a mobile terminal with both a public communication system and a private communication system even when the private communication system retunes its control channel while not in communication with the mobile terminal. This automatic selection of the new control channel for the private communication system is provided by transmitting to mobile terminals not only the control channel frequency (or frequencies) currently in use by the private communication system but also the candidate frequency (or frequencies) that the system will use for subsequent retunes. Accordingly, the mobile terminal is able to respond to retunes occurring while it is not in communication with the private communication system without the need for user intervention by using the saved candidate frequencies.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods or devices. Accordingly, the present invention may take the form of a hardware embodiment, a software embodiment or an embodiment combining software and hardware aspects.

Operations of the present invention will be described primarily herein with reference to mobile terminals which will operate in an IS-136 standard public communication system. However, the benefits of the present invention may also be realized with mobile terminals which operate in other communication systems including support for interconnection with both the public system and a private system within the coverage area of the public system. The present invention will also be described with reference to private systems. However, the present invention may also be utilized with overlapping public systems.

Figure 2:
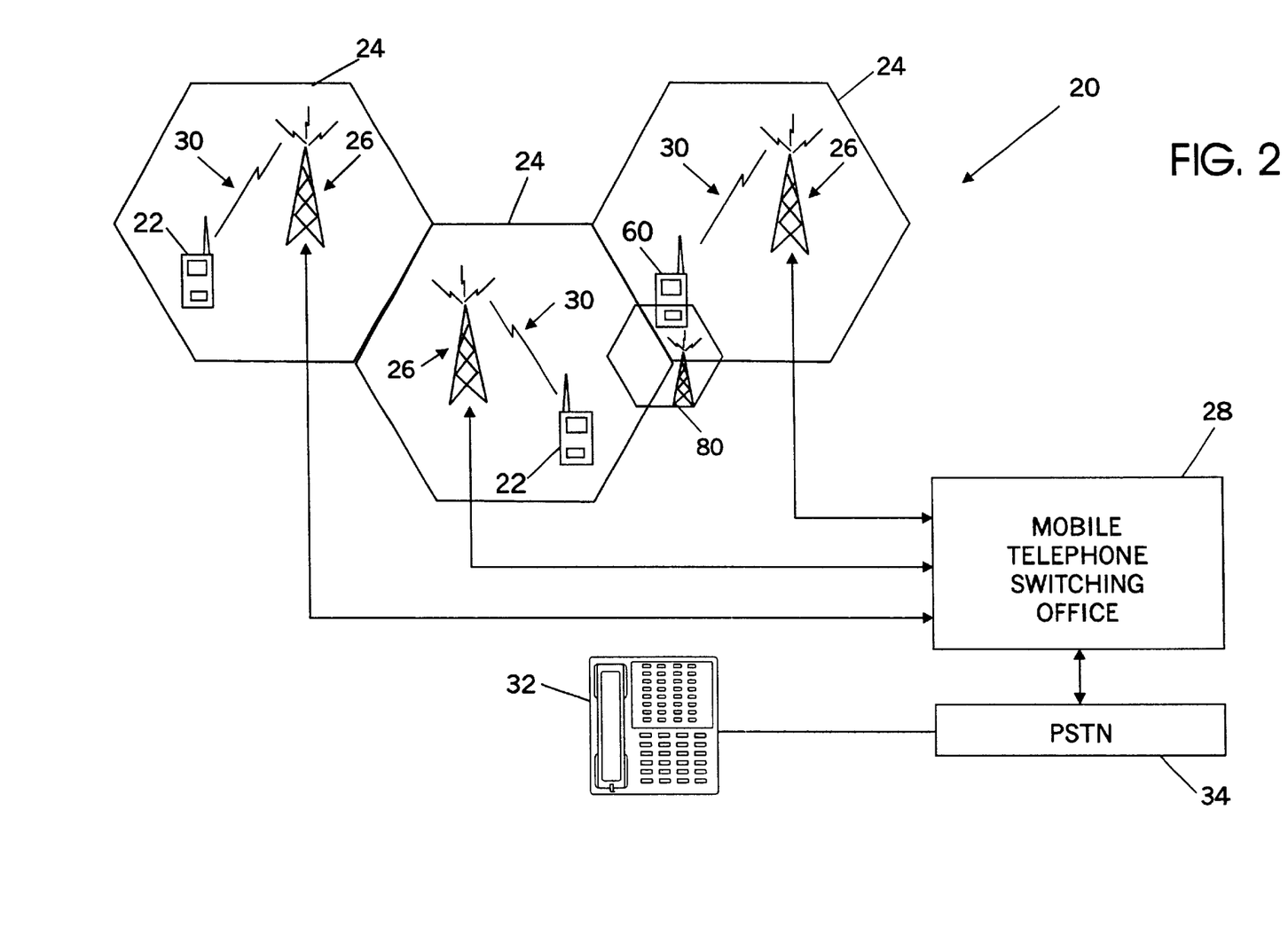
FIG. 2 schematically illustrates a portion of a public wide area cellular network including a private communication system within the coverage area of the public network and a mobile terminal for tracking both according to an embodiment of the present invention.

FIG. 2 illustrates an embodiment of the systems and methods for tracking a private communication system subject to retuning according to the present invention. As illustrated in the embodiment of FIG. 2, a mobile terminal 60 according to the present invention operates within a cell 24 of public communication system 20. For purposes of the discussion herein, public system 20 will be described as an IS-136 standard cellular telephone system. Also shown in FIG. 2 is a private communication system 80 according to the present invention. Private communication system 80 includes a wireless transmission coverage area overlapping several cells 24 of public communication system 20.

Accordingly, pursuant to the present invention, mobile terminal 60 will attempt to acquire communication with private communication system 80 when it is located within any cell 24 of public communication system 20 in which the respective base station 26 transmits a PSP having an associated POF list for private communication system 80. Public communication system 20 otherwise operates as described with respect to FIG. 1.

In the illustrated embodiment of the present invention shown in FIG. 2, private communication system 80 transmits on a control channel its POF information as well as PSP information for the home public cell or cell identifiers covering the region in which private communication system 80 is located. The POF list transmitted by private communication system 80 includes the private system's currently active control channel frequency and at least one, and preferably three, additional candidate control channel frequencies available for use by private communication system 80. As is known with the aforementioned standard IS-136, each cell 24 of the public communications network 20 as well as private communication system 80 include associated identifying information. Preferably, this identifying information is also transmitted along with the POF and PSP information.

Private communication system 80, according to the present invention, periodically retunes its control channel frequencies to reduce problems associated with interference as would be known to those of ordinary skill in the art. A commonly used form of retuning is referred to as an adaptive channel allocation method (ACA) in which the private communication system 80 knows in advance what frequencies it will allocate if it initiates a retune to replace its currently allocated frequency (or frequencies). Note that while it is known to provide private communication systems having more than one active control channel frequency it is preferred, according to the present invention, that only a single one of the allocated control channel frequencies be actively used by private communication system 80 at any given time.

As will be described herein with reference to the flowcharts, according to the present invention, private communication system 80 includes in its transmitted POF list both the currently active control channel frequency and the candidate frequency list specifying the frequencies that will be selected as new control channel frequencies when the existing frequency is replaced. This information is provided and stored by mobile terminal 60 so that terminals 60 may automatically retune to private communication system 80 without requiring user intervention. It is intended that such automatic tuning will enhance the end user's perception of private system support in a POF/PSP system.

According to the present invention, the majority of the retunes of the private communication system 80 will be expected to pass unnoticed to the end user. In fact, retunes may occur during high traffic times as camping mobile terminals, while they will lose the control channel from private communication system 80, will preferably automatically rescan the search list including the candidate control channel frequencies from the POF and lock on the new control channel frequency. Alternatively, the terminal will jump out of the private system and then automatically reacquire the private system pursuant to the methods of the present invention.

Pursuant to the IS-136 standard, PSP information stored by mobile terminal 60, typically for each of a plurality of neighboring adjacent cells, would include the frequency of the active control channel, DVCC and SID/SOC/MCC for each cell. Mobile terminal 60 also stores the PSID and, optionally, name, for private communication systems 80 within the coverage area of one of the stored public cell's PSPs. The private system operating control channel frequency (or frequencies) and one or more candidate control channel frequencies are stored as the POF list.

Figure 3:
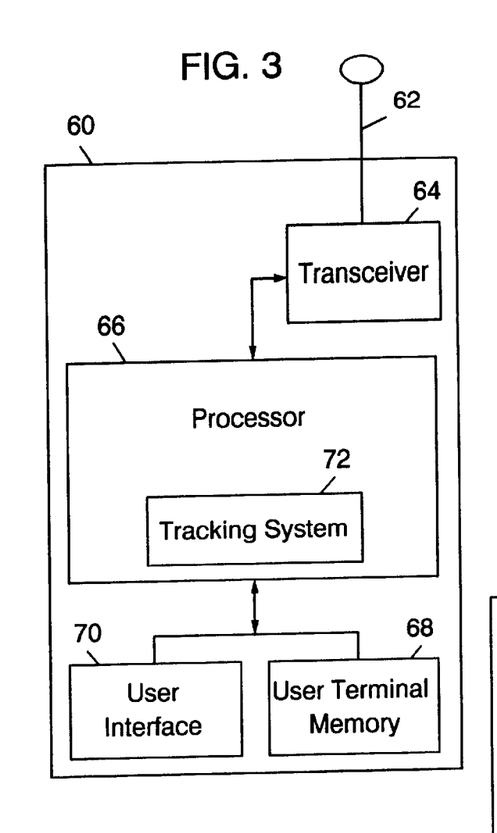
FIG. 3 is a block diagram of a mobile terminal according to an embodiment of the present invention.

Referring now to the embodiment illustrated in FIG. 3, the user (mobile) terminal 60 is a transceiver device capable of communicating with the public communications system 20. The user terminal 60 may operate as a cellular radiotelephone. The user terminal 60 includes an antenna 62 and transceiver 64 or other transceiver means for transmitting and receiving communications to/from a public and/or private communication network (system). The processor 66 accepts and provides information to and from the transceiver 64 and selects a control channel for the user terminal 60 to communicate with the public communication system 20 and/or private communication system 80. The user terminal memory 68 stores information related to the communication systems 20, 80. The user interface 70 may include a key pad by which the user may control the operation of the user terminal 60. User terminal 60 also includes a tracking circuit 72 or other means for tracking a private communication system 80 from mobile terminal 60 by selection of candidate control channel frequencies according to the present invention.

User interface 70 provides both an input and output means. Interface 70, according to one embodiment of the present invention, includes display means for notifying a user, for example, that tracking with a private communication system 80 has been lost. Interface 70 further includes an input means, such as a keyboard, for receiving input from the user, for example, specifying available or preferred private communication systems for initial acquisition. Processor 66, in this embodiment, includes means for controlling the transceiver 64 so as to communicate over the public system 20 and/or the private system 80. Memory 68 preferably contains a list of candidate carriers as stored POF information associated with a PSP as well as a PSP associated with the stored POFs in a format such as illustrated for IS-136 in Table 1.

Figure 3A:
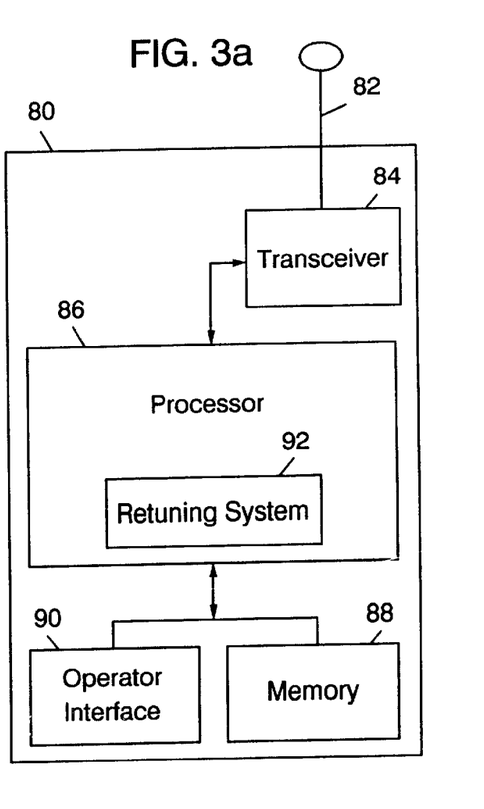
FIG. 3a is a block diagram of a private communication system according to an embodiment of the present invention.

Referring now to the embodiment illustrated in FIG. 3a, the private communication system 80 is illustrated as a single base station. However, it is to be understood that the system would typically be expected to include a plurality of stations as illustrated interconnected through a common server. Private communication system 80 is a transceiver device capable of communicating with the mobile terminals 60. The system 80 includes an antenna 82 and transceiver 84 or other transceiver means for transmitting and receiving communications to/from a mobile terminal. The processor 86 accepts and provides information to and from the transceiver 84 and selects a control channel frequency for the private communication system 80 to communicate control information to mobile terminal 60. The memory 88 stores information related to the communication systems 20, 80. The user interface 90 may include a key pad by which the user may control the operation of the private communication system 80. Private communication system 80 also includes a retuning circuit 92 or other means for adaptively changing the control channel frequency of private communication system 80 to respond to potential interference problems. As was described with reference to FIG. 3, an active and a number of alternate candidate control channel frequencies are maintained by private communication system 80.

As will be appreciated by those of skill in this art, the above-described aspects of the present invention in FIGS. 3 and 3a may be provided by hardware, software, or a combination of the above. While various components of mobile terminal 60 and the private communication system 80 have been illustrated in FIGS. 3 and 3a, in part, as discrete elements, they may, in practice, be implemented by a microcontroller including input and output ports and running software code, by custom or hybrid chips, by discrete components or by a combination of the above. For example, memory 68 may be contained within processor 66. Similarly, various of the operations of tracking system 72 may be implemented as code executing on processor 66 as shown in the illustrated embodiment.

Operations of the present invention will now be described with respect to the flowcharts of FIGS. 4 and 5. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor, such as processor 66 of FIG. 3, to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 4:
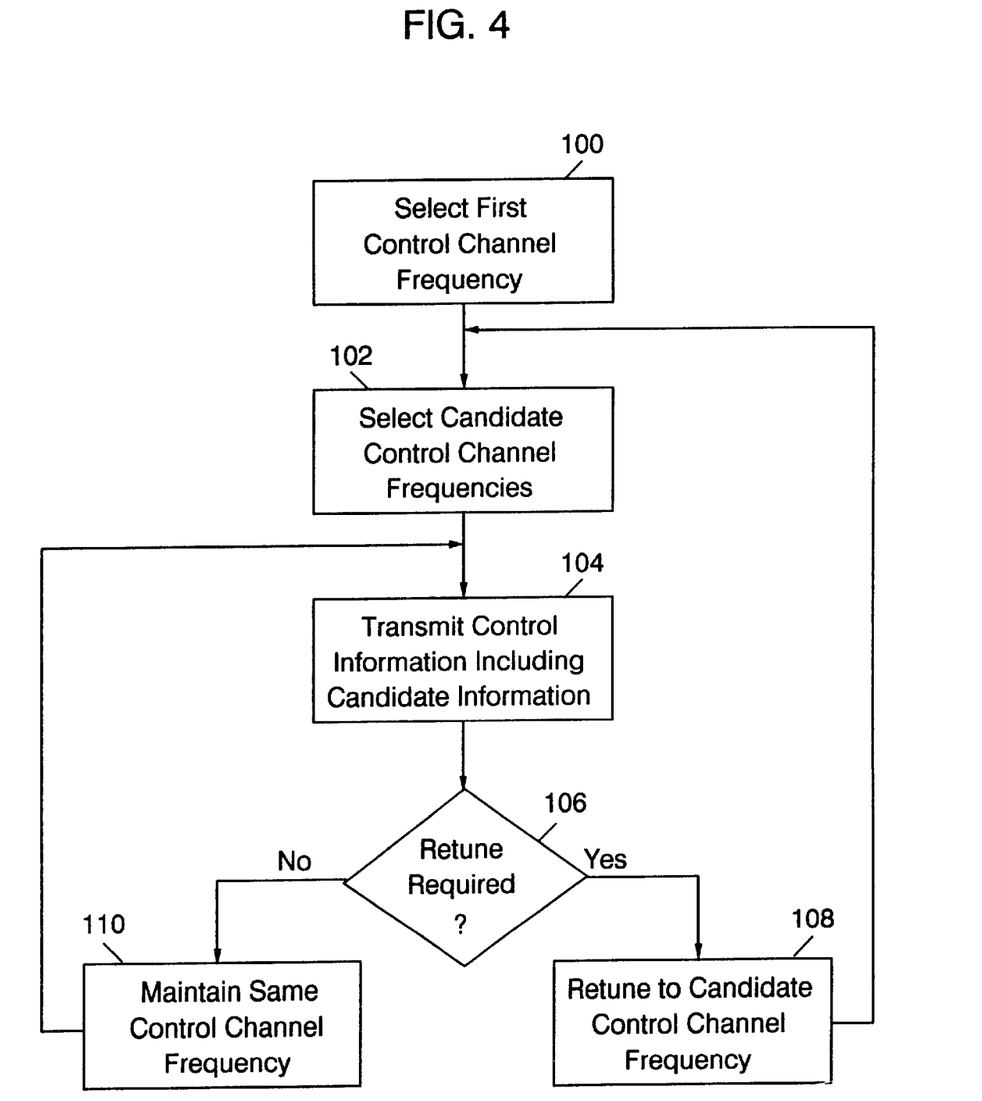
FIG. 4 is a flowchart illustrating operations for transmitting and retuning a control channel in a private radio communication system according to an embodiment of the present invention.

Referring now to FIG. 4, operations for selecting and transmitting control information by a private communication system 80 according to an embodiment of the present invention will now be described. At block 100, private radio communication system 80 selects a first control channel frequency for use in transmitting control information. At block 102, private communication system 80 selects one or more candidate control channel frequencies for the private communication system. These candidate control channel frequencies are preferably maintained in a sequential order reflecting the sequence which will be used by private communication system 80 in selecting frequencies for retuning under an adaptive channel allocation methodology.

At block 104, private communication system 80 transmits control information on the first control channel frequency for reception by a mobile terminal in the coverage area of private communication system 80. In addition to information related to normal control operations supporting communication traffic within private communication system 80, the control information includes an identification of the candidate control channel frequencies and an identification of private communication system 80. Preferably, the transmission also includes PSP information for the home cell or cells of a public communication system 20 in which private communication system 80 resides, thereby providing identification information for the cell.

At block 106, private communication system 80 determines if control channel frequency retuning is required. This determination is preferably accomplished using an adaptive channel allocation methodology such as those which are known to persons of ordinary skill in the art. Accordingly, the adaptive channel allocation methodology will not be further described herein. If retuning is required, at block 108 private communication system 80 retunes to the next sequential candidate control channel frequency from the sequences of POFs established at block 102. Operations then return to block 102 to update the candidate control channel frequency list as one of the candidate frequencies has now been selected and taken the place of the first control channel frequency so the candidate list is preferably updated after each retuning to transmit a full list of candidate carriers to mobile terminals 60.

Operations then proceed again to block 104 with private communication system 80 transmitting the control information on the newly selected candidate control channel frequency including the updated POF list of candidate control channel frequencies. For example, if only a single candidate control channel frequency is maintained, a second selected candidate control channel frequency is chosen at block 102 after operations move from block 108. The second selected candidate control channel frequency is included in the control information transmitted subsequently at block 104. Note that frequencies may be reused, in which case the control channel frequency in active use before the retune may be added to the list of candidate control channel frequencies after retuning at block 108.

While it is possible to obtain the benefits of the present invention with only a single alternate candidate carrier for retuning, it is preferred that a plurality of candidate control channel frequencies for the private radio communication system be selected at block 102 and that identification of all of the plurality of candidate control channel frequencies in a selection order be transmitted at block 104.

Figure 5:
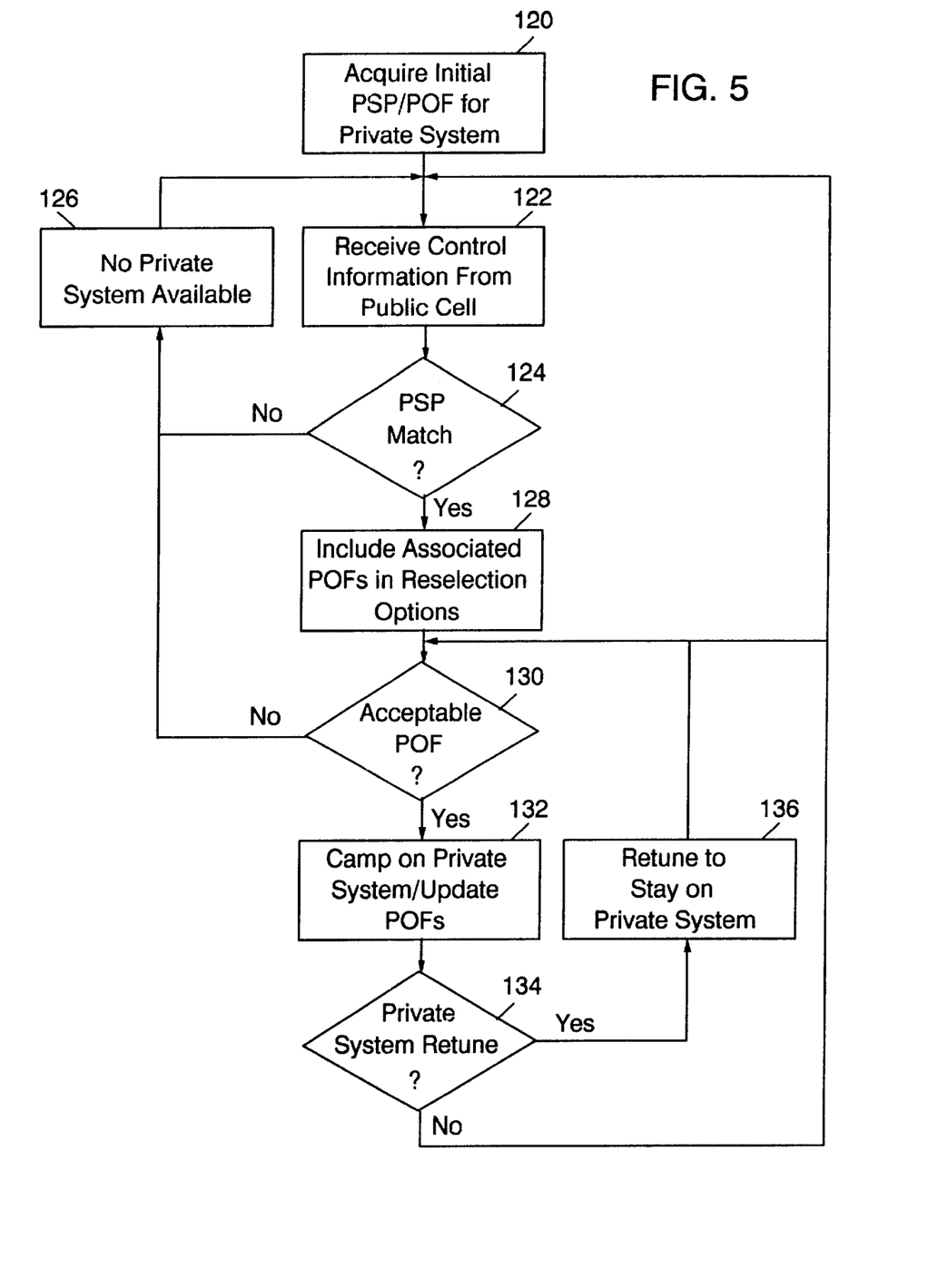
FIG. 5 is a flowchart illustrating operations for a mobile terminal tracking a private communication system within the coverage area of a public communication system according to an embodiment of the present invention.

Referring now to FIG. 5, operations according to the present invention for locating/tracking a private radio communication system according to the present invention will now be further described. At block 120, operations begin with mobile terminal 60 acquiring initial PSP/POF information for private communication system 80. This may occur, for example, by a user initiated manual system search when a user moves to a new geographic region, or this initial information may be stored in mobile terminal 60 by a service provider at the time mobile terminal 60 is activated and sold to a user.

At block 122, mobile terminal 60 receives control information transmitted by a base station 26 in a local cell 24 of public communication network 20. At block 124, mobile terminal 60 determines if the PSP received in the control information matches a PSP stored in mobile terminal 60. If no PSP match is found at block 124, mobile terminal 60 contains no associated POF information for that geographic region as indicated at block 126 and remains camped on public communication system 20 with operations returning to block 122.

If a PSP match is found at block 124, the associated POFs for private communication system 80 are included in mobile terminal 60 reselection options at block 128. Pursuant to the IS-136 standard, mobile terminal 60 then considers these associated POFs as well as PSPs in mobile assisted handover and reselection operations. At block 130, mobile terminal 60 determines if an acceptable POF has been identified during reselection operations. If not, operations return to block 126 and communications continue through public communication system 20 as no private system is available.

If an acceptable POF is found and mobile terminal 60 is configured to prefer operations on a private communication system 80 over public system 20 when the private system is available, mobile terminal 60 camps on private system 80 at block 132. While connected to private system 80 at block 132, mobile terminal 60 is further able to update POF information as such information is contained in the control information transmitted by private communication system 80.

If a system retune by private communication system 80 is detected at block 134, mobile terminal 60 attempts to retune to stay on private system 80 at block 136. Alternatively, mobile terminal 60 may first return to the public system and then reacquire the private system as shown by the dotted line in FIG. 5. Mobile terminal 60 detects a private system retune at block 134 by detecting an absence of transmitted control information from private communication system 80 on the active control channel frequency of the private system. Mobile terminal 60 then retunes at block 136 to receive control information from the private communication system 80 on a candidate control channel frequency when control information is not being transmitted on the original active control channel frequency. Regardless of whether a retune is detected at block 134 and retuning occurs at block 136 or not, operations move back to block 130 where, so long as the control information is still being received from private communication system 80, mobile terminal 60 continues to camp on the private system as illustrated at block 132.

Automatic retuning to a private communication system after a mobile terminal is moved out of the region of the private communication system is also shown in FIG. 5. If mobile terminal 60 moves out of the range of private communication system 80, it will no longer receive control channel information from private system 80 and, as indicated at block 130, operations will move back to receiving control information from the local cell of the public system 20 as indicated at block 122. If the mobile terminal 60 has moved to a different cell, then mobile terminal 60 will detect this move when it receives the control information from the new public cell at block 122 and will test for a PSP match on the new cell at block 124. Operations may then include acquisition of a different private system associated with the new PSP or continued operations through the public system.

On return to the original public cell region in which private communication system 80 resides, the appropriate PSP will be received at block 122 and mobile terminal 60 will detect a match to that PSP at block 124 and add its previously saved POFs associated with private communication system 80 to its reselection options at block 128. Assuming that mobile terminal 60 has not been isolated from private communication system 80 for a sufficient period for the adaptive channel allocation methodology of private system 80 to make all of the previously saved candidate control channel frequencies invalid, mobile terminal 60 will successfully detect an acceptable POF reflecting the current control channel frequency in use by private communication system 80 at block 130. Mobile terminal 60 will then recamp on private communication system 80 at block 132 and update its associated POF list to the current list of candidate control channel frequencies for private communication system 80. Accordingly, using the methods and systems of the present invention, mobile terminal 60 is able to leave the region of private communication system 80 and return after a retuning by private communication system 80 and still reacquire the system without user intervention.

The present invention also provides private communication systems and mobile terminals supporting the benefits of the present invention. A private communication system 80 according to the present invention may include a means for selecting a first control channel frequency for the frequency at which the control channel is transmitted by the private communication system and at least one alternate candidate control channel frequency (and preferably a plurality of candidate control channel frequencies)(processor 86). Means coupled to the means for selecting is provided for changing the frequency on which the private radio communication system 80 transmits the control channel from the first control channel frequency to a selected one of the at least one alternate candidate control channel frequencies, preferably using an adaptive channel allocation system (retuning system 92). Means are also provided coupled to the means for changing the frequency for transmitting the control information at the frequency on which the private communication system transmits the control channel for receipt by a mobile terminal 60 in the coverage area of the private communication system 80 which control information includes an identification of the at least one alternate candidate control channel frequency and an identification of private communication system 80 (transceiver 84 through antenna 82 responsive to processor 86).

A mobile terminal for use with a private radio communication system which transmits control information on one of a plurality of control channel frequencies according to the present invention (see FIG. 3) includes means for receiving the control information (transceiver 64 through antenna 62). The received control information includes an identification of a candidate control channel frequency as well as the active control channel frequency on which the transmission is received. Mobile terminal 60 further includes means for detecting an absence of received transmitted control information from the private communication system on the first (or original) active control channel frequency and for receiving control information from the private communication system on a candidate control channel frequency if control information from the private communication system is not being received on the first control channel frequency (transceiver 64 responsive to tracking system 72 of processor 66).

Preferably, mobile terminal search operations according to the present invention further provide for an opportunity for the user of the mobile terminal to interfere and force attempts to obtain initial acquisition of a specified private communication system. This may be provided based upon a menu interface of user interface 70. The user may be provided an express right to select a specific private communication system to attempt to acquire from an available list.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for retuning of a communication system comprising the steps of:
    selecting a first control channel frequency for the communication system;
    selecting a candidate control channel frequency for use by the communication system in retuning of a base station of the communication system; and
    transmitting control information on the first control channel frequency wherein the control information includes an identification of the candidate control channel frequency and an identification of the communication system.

2. A method according to claim 1 wherein the communication system is a private communication system.

3. A method according to claim 2 wherein the private communication system is an IS-136 compliant system.

4. A method according to claim 2 wherein the private communication system is within a cell of a public communication system and wherein the control information includes identification information for the cell.

5. A method according to claim 4 wherein the identification information for the cell is a public service profile for the cell.

6. A method for tracking of a private communication system comprising the steps of:
  selecting a first control channel frequency for the private communication system:
  selecting a candidate control channel frequency for the private communication system;
  transmitting control information on the first control channel frequency wherein the control information includes an identification of the candidate control channel frequency and an identification of the private communication system;
  retuning the private communication system to transmit control information on the candidate control channel frequency instead of the first control channel frequency; and
  transmitting control information on the candidate control channel frequency, wherein the control information includes an identification of a second selected candidate control channel frequency and an identification of the private communication system.

7. A method according to claim 6 wherein the retuning step further comprises the step of retuning the private communication system using an adaptive channel allocation scheme having a determined sequence of alternate candidate carriers for retuning and wherein the step of selecting a candidate control channel frequency comprises the step of selecting a plurality of the alternate candidate carriers as a plurality of candidate control channel frequencies for the private communication system and wherein the control information includes an identification of the plurality of candidate control channel frequencies and an associated sequence of the candidate control channel frequencies based on the adaptive channel allocation scheme.

8. A method for tracking of a private communication system comprising the steps of:
  selecting a first control channel frequency for the private communication system,
  selecting a candidate control channel frequency for the private communication system;
  transmitting control information on the first control channel frequency, wherein the control information includes an identification of the candidate control channel frequency and an identification of the private communication system:
  wherein the transmitting step is followed by the following steps performed by a mobile terminal:
    receiving the control information on the first control channel frequency from the private communication system; and then
    receiving control information from the private communication system on the candidate control channel frequency if control information from the private communication system is absent from the first control channel frequency.

9. A method according to claim 8 wherein the private communication system is within a cell of a public communication system and wherein the control information includes identification information for the cell.

10. A method according to claim 9 wherein the identification information for the cell is a public service profile for the cell.

11. A method according to claim 9 wherein the transmitting step is followed by the steps of:
  retuning the private communication system to transmit control information on the candidate control channel frequency instead of the first control channel frequency;
  transmitting control information on the candidate control channel frequency, wherein the control information includes an identification of a second selected candidate control channel frequency and an identification of the private communication system; and
  wherein the step of receiving control information comprises the step of receiving control information from the private communication system on the second selected candidate control channel frequency if control information from the private communication system is not being received on either the first control channel frequency or the candidate control channel frequency.

12. A method according to claim 11 wherein the mobile terminal is IS-136 compliant.

13. A method according to claim 8 wherein the selecting step comprises the step of selecting a plurality of candidate control channel frequencies for the private communication system and wherein the transmitting step includes the step of transmitting identifications of the plurality of candidate control channel frequencies and wherein the receiving control information step comprises the step of receiving control information from the private communication system on at least one of the plurality of candidate control channel frequencies if control information from the private communication system is not being received on the first control channel frequency.

14. A method for locating a retuned private communication system which transmits control information on one of a plurality of control channel frequencies from a mobile terminal comprising the steps of:
  receiving the control information including an identification of a candidate control channel frequency for use by the private communication system to retune a base station of the private communication system, the candidate control channel frequency being selected from the plurality of control channel frequencies, on a first control channel frequency selected from the plurality of control channel frequencies; and then
  receiving control information from the private communication system on the candidate control channel frequency if control information from the private communication system is not being received on the first control channel frequency.

15. A method according to claim 14 wherein the private communication system is within a cell of a public communication system and wherein the control information includes identification information for the cell.

16. A method according to claim 15 wherein the identification information for the cell is a public service profile for the cell.

17. A method according to claim 15 wherein the mobile terminal is IS-136 compliant.

18. A method for locating a retuned private communication system which transmits control information on one of a plurality of control channel frequencies from a mobile terminal comprising the steps of:

receiving the control information including an identification of a candidate control channel frequency for use by the private communication system to retune, the candidate control channel frequency being selected from the plurality of control channel frequencies, on a first control channel frequency selected from the plurality of control channel frequencies, and then receiving control information from the private communication system on the candidate control channel frequency if control information from the private communication system is not being received on the first control channel frequency; and wherein the control information includes identifications of a plurality of candidate control channel frequencies for the private communication system and wherein the receiving control information step comprises the step of receiving control information from the private communication system on at least one of the plurality of candidate control channel frequencies if control information from the private communication system is not being received on the first control channel frequency.

19. A private communication system comprising:

means for selecting a first control channel frequency for a control channel and at least one candidate control channel frequency for use by the private communication system to retune a base station of the private communication system;

means coupled to the means for selecting for changing a frequency on which the private communication system transmits the control channel from the first control channel frequency to a selected one of the at least one candidate control channel frequency;

means coupled to the means for changing a frequency on which the private communication system transmits for transmitting control information on the control channel, wherein the control information includes an identification of the at least one candidate control channel frequency and an identification of the private communication system.

20. A system according to claim 19 wherein the private communication system is an IS-136 compliant system.

21. A system according to claim 20 wherein the private communication system is within a cell of a public communication system and wherein the control information includes identification information for the cell.

22. A system according to claim 21 wherein the identification information for the cell is a public service profile for the cell.

23. A mobile terminal for use with a communication system which transmits control information on one of a plurality of control channel frequencies used by the communication system to retune comprising:

means for receiving the control information including an identification of a candidate control channel frequency for use by the communication system to retune selected from the plurality of control channel frequencies on a first control channel frequency selected from the plurality of control channel frequencies; and then means for receiving control information from the communication system on the candidate control channel frequency if control information from the communication system is not being received on the first control channel frequency.

24. A method for retuning of a communication system comprising the steps of:

selecting a first control channel frequency for the communication system;

selecting a candidate control channel frequency for use by the communication system in retuning;

transmitting control information on the first control channel frequency, wherein the control information includes an identification of the candidate control channel frequency and an identification of the communication system; and wherein the step of selecting a candidate control channel frequency further comprises the step of selecting a plurality of candidate control channel frequencies for the communication system for use in an adaptive channel allocation (ACA) scheme and wherein the step of transmitting control information further comprises the step of transmitting control information on the first control channel frequency, wherein the control information includes an identification of the plurality of candidate control channel frequencies and an associated sequence of the candidate control channel frequencies based on the ACA scheme.

25. A method for locating a retuned private communication system which transmits control information on one of a plurality of control channel frequencies from a mobile terminal comprising the steps of;

receiving the control information including an identification of a candidate control channel frequency for use by the private communication system to retune, the candidate control channel frequency being selected from the plurality of control channel frequencies, on a first control channel frequency selected from the plurality of control channel frequencies; and then receiving control information from the private communication system on the candidate control channel frequency if control information from the private communication system is not being received on the first control channel frequency; and wherein the step of receiving the control information further comprises the step of receiving control information including an identification of a plurality of candidate control channel frequencies selected from the plurality of control channel frequencies and an associated sequence of the candidate control channel frequencies based on an adaptive channel allocation (ACA) scheme.

26. A private communication system comprising:

means for selecting a first control channel frequency for a control channel and at least one candidate control channel frequency for use by the private communication system to retune;

means coupled to the means for selecting for changing a frequency on which the private communication system transmits the control channel from the first control channel frequency to a selected one of the at least one candidate control channel frequency;

means coupled to the means for changing a frequency on which the private communication system transmits for transmitting control information on the control channel, wherein the control information includes an identification of the at least one candidate control channel frequency and an identification of the private communication system; and wherein the at least one candidate control channel frequency comprises a plurality of candidate control channel frequencies for use in an adaptive channel allocation (ACA) scheme and wherein the means for transmitting further comprises means for transmitting control information on the control channel, wherein the control information includes an identification of the plurality of candidate control channel frequencies and an associated sequence of the candidate control channel frequencies based on the ACA scheme.

27. A mobile terminal for use with a communication system which transmits control information on one of a plurality of control channel frequencies used by the communication system to retune comprising;

means for receiving the control information including an identification of a candidate control channel frequency for use by the communication system to retune selected from the plurality of control channel frequencies on a first control channel frequency selected from the plurality of control channel frequencies; and then means for receiving control information from the communication system on the candidate control channel frequency if control information from the communication system is not being received on the first control channel frequency, and wherein the means for receiving the control information her comprises means for receiving control information including an identification of a plurality of candidate control channel frequencies selected from the plurality of control channel frequencies, and an associated sequence of the candidate control channel frequencies based on an adaptive channel allocation (ACA) scheme.

* * * * *